No. 639,525. Patented Dec. 19, 1899.
A. W. CONATSER.
PRUNING SHEARS.
(Application filed Dec. 1, 1898.)
(No Model.) 2 Sheets—Sheet 2.
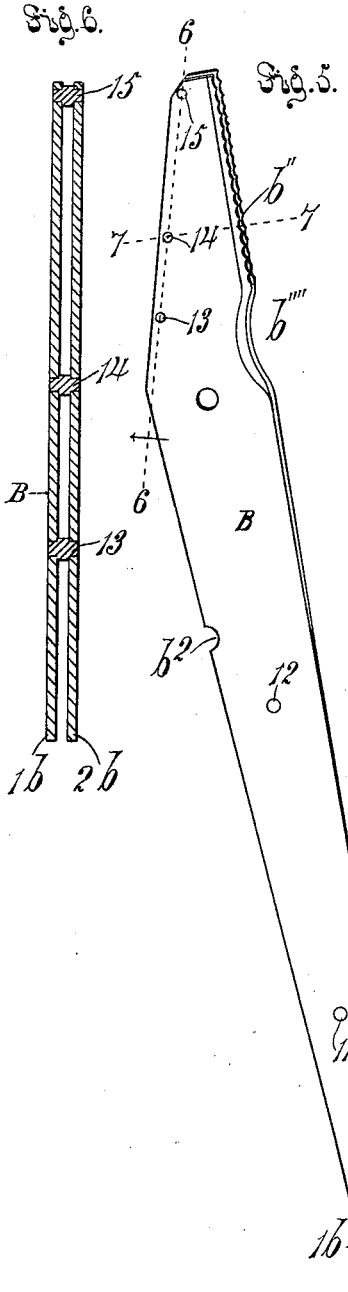
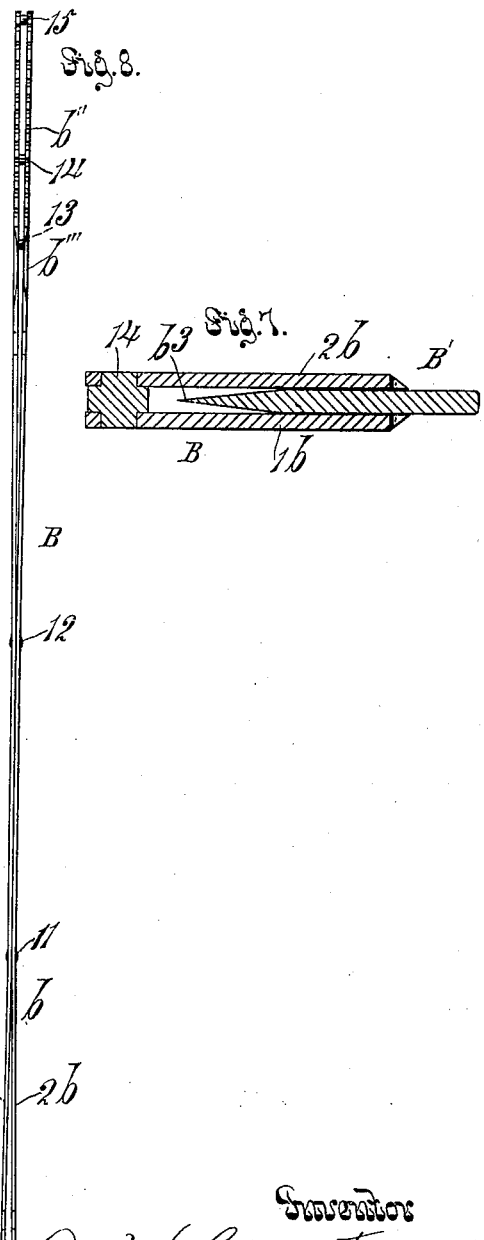

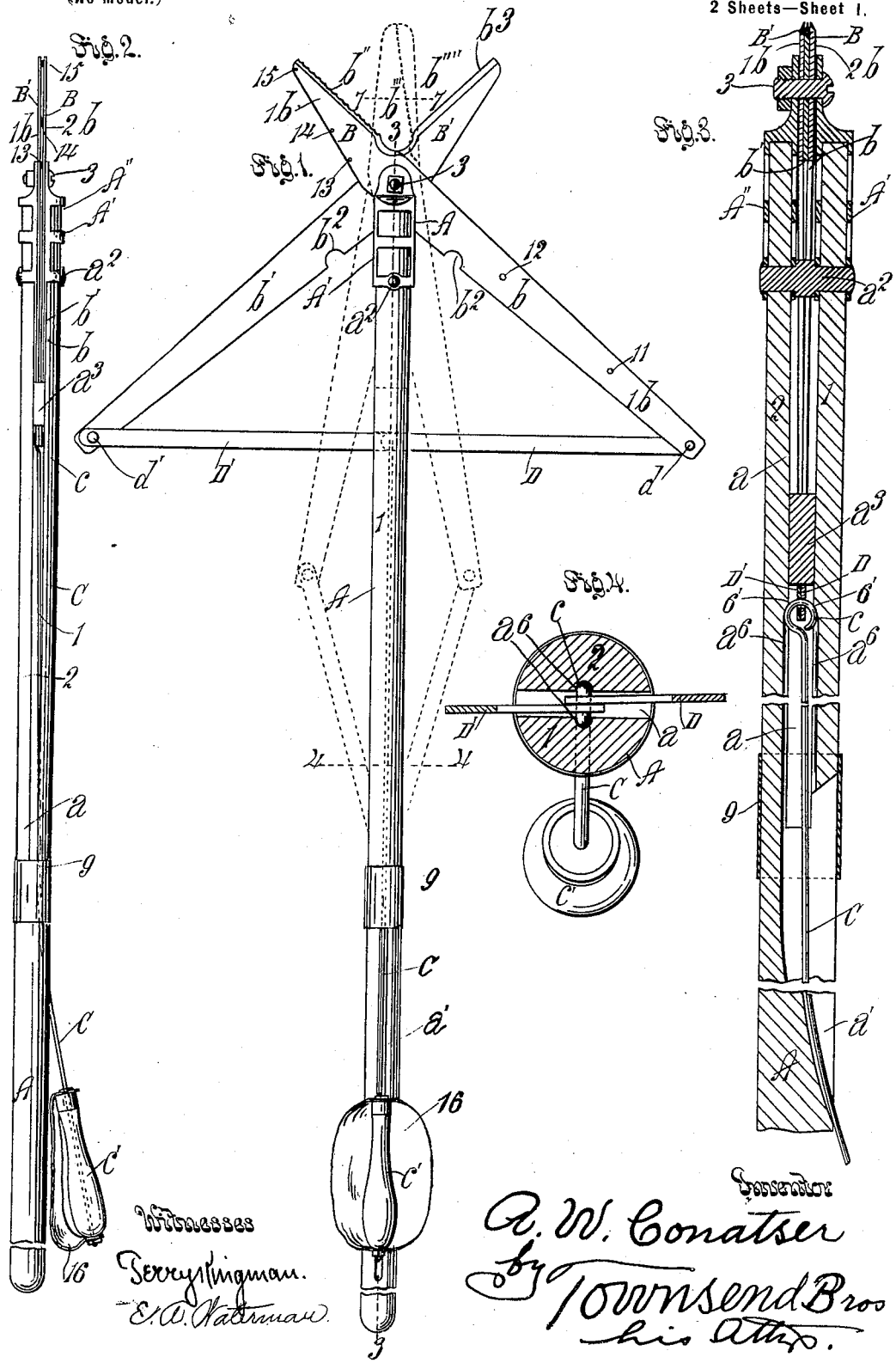

UNITED STATES PATENT OFFICE.

ANDREW W. CONATSER, OF LOS ANGELES, CALIFORNIA.

PRUNING-SHEARS.

SPECIFICATION forming part of Letters Patent No. 639,525, dated December 19, 1899.

Application filed December 1, 1898. Serial No. 698,018. (No model.)

*To all whom it may concern:*

Be it known that I, ANDREW WILSON CONATSER, residing at Los Angeles, in the county of Los Angeles and State of California, have invented new and useful Improvements in Pruning-Shears, of which the following is a specification.

The object of my invention is to provide superior pruning-shears of very simple construction and which will cut large and small limbs with the greatest ease to the operator.

Another object of my invention is to provide for the practical use of very thin cutting-blades, so that, as compared with former shears, but little power is required to force the blade through a large limb.

The accompanying drawings illustrate my invention.

Figure 1 is a fragmental side elevation of my newly-invented pruning-shears open. Dotted lines indicate the position of parts when the shears are closed. Fig. 2 is an elevation of the same viewed at right angles to Fig. 1. Fig. 3 is an enlarged longitudinal section on line 3 3, Fig. 1. Fig. 4 is a cross-section on line 4 4 of the closed position in Fig. 1. Fig. 5 is an enlarged view of the double-edged blade or stop into which the edge of the cutting-blade works. Fig. 6 is a section of the blade B' on line 6 6, Fig. 5. Fig. 7 is a plan section on line 7 7, Fig. 1, with the blades closed. Fig. 8 is an edge view of the slotted stop-blade B.

My invention comprises the combination of a handle A, slotted, as at $a$, at one end and provided with a hole $a'$, extending through the side of the handle into the lower end of the slot; two blades B B', pivoted in the slot at the end of the handle and having shanks $b\ b'$ to open and close the blades; an operating-rod C, extending into the slot $a$ through the hole $a'$, which passes through the side of the handle, and connecting-bars D D', pivoted to the operating-rod by a hook or eye $c$ and to the lower ends of the shanks $b\ b'$, respectively, by pivots $d\ d'$.

$a^2$ indicates a stop in the slot to stop the shanks when the blades are closed, as shown in dotted lines in Fig. 1, and to hold the lower portions of the shanks extended at an angle to the handle, so that when the blades are fully closed an upward movement of the operating-rod will cause the shanks to move outward and the blades to thereby be opened.

$a^3$ indicates a strengthening block or brace to stiffen and strengthen the side members 1 2 of the handle.

3 indicates the pivot which pivots the blades together in the head of the handle.

Preferably I provide a sheath or socketed head, as at A' and A'', for the end of each of the members 1 2 of the handle.

The stop $a^2$ is preferably made of a double-ended rivet enlarged at the middle, the enlarged portion being in the slot and the ends of the rivet inserted through the sheaths A'A'' and the members 1 2 of the handle. The sheaths rest against the enlarged portion of the rivet and are thereby held apart. The ends of the rivets are set in the outside of the sheaths, thus providing a rigid head at the end of the members.

Preferably one of the blades is a double-edged blade, as at B, and is slotted through from back to edge, and the other blade, B', is pivoted in the slot with its edge to work into the slotted edge of the blade B. The blade B is preferably to serve as a stop to hold the limb, while all or nearly all of the cutting is performed by the other blade. The stop-blade B is preferably provided with a number of notches, as at $b''$, to prevent the limb from slipping along the slotted edge. The edge of the other blade is preferably straight, except near the heel.

$b'''\ b''''$ indicate two notches located near the pivot of the blade, each of the blades being provided with a notch to clasp around a limb of the larger size to be cut, so as to hold such larger limb firmly at a point close to the pivot, so that the necessary power can easily be exerted to cut the limb.

The edge $b^3$ of the cutting-blade B' are preferably beveled on each side, so that the strain coming upon the blade will not force the blade sidewise. The other blade is beveled on its outer sides, so as to avoid as much as possible any bruising of the limbs by the stop-blade and also to support the limb as close to the cut as possible, thus to prevent any splintering of the limb when the cutting edge passes through the limb.

The stop-blade B and its shank are preferably made of two strips $1^b\ 2^b$, which are preferably each the same shape and size as the blade B' with its shank. These strips are preferably riveted together by rivets 11 12 in the body of the shank and by rivets 13, 14, and 15 at the back of the blade. The rivets 13, 14, and 15 at the back of the blade are enlarged between their ends, so as to support or hold the strips at the required distance apart. The cutting-blade B' and the connecting-rod D are seated between the two strips and are held in place by their respective pivots. The pivot $d$ is formed of a rivet. The shanks of the blades are of considerable length and weight compared to the blades.

In practical operation the operator will hold the handle A with one hand and will grasp the handle $c'$ of the rod C with the other hand. He will then bring the blades into their open position by pushing up on the handle $c'$ and will bring the blades into position beneath the limb to be cut. Then the handle $c'$ is drawn down with a quick motion, and the momentum and the weight of the moving parts below the pivot 3 will drive the edges of the shears-blades B B' toward each other with great force. The stop-blade holds the limb, and the thin blade B' will be driven through the limb, and the limb will be severed with much ease to the operator.

It is not necessary to extend the blades widely apart in order to get the force necessary to cut small limbs.

The operating-rod is sufficiently flexible to work freely through the side hole without cramping.

9 indicates a band at the lower end of the slot to keep the handle A from splitting.

$a^6$ indicates longitudinal grooves cut on the inside of the members 1 2 of the handle. The hook $c$ of the rod C is wider than the slot $a$ and extends into the grooves $a^6$ on the opposite sides of said slot, thereby to be guided along the axis of the handle, so that the point at which the connecting-rods D D' are pivoted together will always travel along the axis of the handle. The upper ends $6'$ of the grooves form stops for the hook to prevent it from going too high.

$b^2$ indicates notches cut in the shanks of the blades to embrace the rivet-stop $a^3$, thus to give a greater bearing-surface of the shank on the rivet to prevent undesirable battering and wearing of the parts.

In case the shears become worn by grinding the notches can be deepened, if necessary, in order to allow the edges to pass each other the proper distance.

The blade B' is to be made of tool-steel, but the blade B may be made of ordinary sheet-steel.

The slotted form of stop-blade shown is preferable; but it is to be understood that I do not limit my invention to the use of a slotted blade.

Now, having described my invention, what I claim as new, and desire to secure by Letters Patent, is—

1. The combination of a slotted handle provided with a side hole opening into the slot; two blades with shanks pivoted in the slot; a stop to stop the shanks when the blades are closed and to hold the lower ends of the shanks extended at an angle to the handle; an operating-rod extending through the side hole; and connecting-rods pivoted to the operating-rod and to the lower ends of the shanks respectively.

2. Pruning-shears comprising a handle; two blades with shanks pivoted to the handle, the edge of one of the blades having a series of notches and a large notch at the heel and the edge of the other blade being straight except a large notch at the heel to correspond with the notch of the other blade; and means for operating the blades.

3. The combination of the slotted handle with internal longitudinal grooves and the side hole; the shears-blades with shanks pivoted in the slot of the handle; an operating-rod extending through the side hole and into the slot and provided at its end with a hook which extends into the grooves at the side of the slot; and connecting-rods through which the hook is inserted to pivot them together and said connecting-rods being pivoted to the shanks, respectively, substantially as set forth.

A. W. CONATSER.

Witnesses:
 JAMES R. TOWNSEND,
 ALFRED I. TOWNSEND.